United States Patent [19]

Hitomi et al.

[11] Patent Number: 5,230,320
[45] Date of Patent: Jul. 27, 1993

[54] INTAKE AND EXHAUST CONTROL SYSTEM FOR AUTOMOBILE ENGINE

[75] Inventors: Mitsuo Hitomi; Junsou Sasaki; Yasuhide Yano, all of Hiroshima, Japan

[73] Assignee: Mazda Motor Corporation, Hiroshima, Japan

[21] Appl. No.: 906,302

[22] Filed: Jun. 29, 1992

[30] Foreign Application Priority Data

Jun. 27, 1991 [JP] Japan ................... 3-156600
Jun. 28, 1991 [JP] Japan ................... 3-159115

[51] Int. Cl.⁵ ............................................. F02B 33/00
[52] U.S. Cl. .................... 123/559.1; 123/90.15; 123/432; 123/308; 60/289; 60/303
[58] Field of Search ............ 123/559.1, 559.2, 568, 123/432, 308, 90.15, 90.16, 559.3; 60/289, 303

[56] References Cited

U.S. PATENT DOCUMENTS

| | | | |
|---|---|---|---|
| 4,211,074 | 7/1980 | Hattori | 60/289 |
| 4,363,209 | 12/1982 | Atago et al. | 60/289 |
| 4,548,175 | 10/1985 | Kawai et al. | 123/308 |
| 4,667,636 | 5/1987 | Oishi et al. | 123/432 |
| 5,085,199 | 2/1992 | Sado et al. | 123/559.1 |
| 5,090,200 | 2/1992 | Arai | 60/303 |
| 5,115,788 | 5/1992 | Sasaki et al. | 123/559.3 |
| 5,119,631 | 6/1992 | Kayanuma et al. | 60/289 |
| 5,121,716 | 6/1992 | Takahashi et al. | 123/432 |
| 5,161,497 | 11/1992 | Simko et al. | 123/90.15 |
| 5,186,128 | 2/1993 | Murata et al. | 123/90.16 |

FOREIGN PATENT DOCUMENTS

| | | | |
|---|---|---|---|
| 58-220933 | 12/1983 | Japan | 123/308 |
| 61-11453 | 1/1986 | Japan | 123/308 |
| 2-119621 | 5/1990 | Japan | 123/289 |

Primary Examiner—Raymond A. Nelli
Attorney, Agent, or Firm—Keck, Mahin & Cate

[57] ABSTRACT

An engine control system for controlling an internal combustion engine equipped with a mechanical supercharger includes a valve timing control mechanism which causes first and second intake valves for each cylinder to retard opening and closing of a first intake port with respect to opening and closing of a second intake port. Opening and closing of the first intake port is retarded when a specific range of engine operating conditions, in which the supercharger is operating, is detected.

7 Claims, 4 Drawing Sheets

INTAKE AND EXHAUST CONTROL SYSTEM FOR AUTOMOBILE ENGINE

BACKGROUND OF THE INVENTION

1. Field of the Invention

This invention relates to an engine control system for an internal combustion engine and, more particularly, to an intake and exhaust control system for an internal combustion engine equipped with a mechanical supercharger.

2. Description of Related Art

An internal combustion engine has been developed with improved charging efficiency obtained by means of a supercharger, such as a mechanical supercharger, driven by the engine. The supercharger is typically operated while the engine operates under higher engine loads for high charging efficiency, but is not operated while the engine operates under lower engine loads. Such an engine is known from, for instance, Japanese Unexamined Patent Publication No. 58-220,933. Increasing the charging efficiency increases engine output power and decreases fuel consumption while the engine operates under higher engine loads, but also cause a considerable increase in cylinder temperature and engine knock.

To suppress an increase in cylinder temperature, burned gases may be scavenged in the cylinder with intake air. In order to effectively scavenge burned gases, especially while the engine operates in a high speed range in which engine knock is easily caused, the degree or length of time that an intake valve and an exhaust valve are held open, which is referred as valve overlap, is extended. Such an engine and supercharger combination is known from, for instance, Japanese Unexamined Patent Publication No. 2-119,621.

An internal combustion engine has also been developed with improved charging efficiency obtained by means of a multi-valve mechanism having, for instance, two intake valves for each cylinder. Such a multi-valve internal combustion engine opens either one of the two intake valves when operating in a low speed range and both the two intake valves when operating in a high speed range. This type of an engine and supercharger combination is known from, for instance, Japanese Unexamined Patent Publication No. 61-11,455.

If a multi-valve internal combustion engine is equipped with a mechanical supercharger, engine knocks are easily caused, due to an increase in cylinder temperature. To suppress an increase in cylinder temperature in a multi-valve internal combustion engine, a valve overlap time period between an intake valve and an exhaust valve can be extended so as to cause effective scavenging of burned gases. Further, in order to perform effective scavenging of burned gases by means of intake air forcibly supplied by the supercharger, the valve overlap time period is established so as to be relatively long.

As outlined above, in an internal combustion engine with a mechanical supercharger, in order to perform effective scavenging of burned gases and thereby avoid engine knock, a valve overlap time period may be designed to be relatively long. In such an engine, fuel introduced into a cylinder will be blown out from the cylinder through an exhaust port.

An internal combustion engine equipped with a mechanical supercharger forces a fuel mixture to be blown out from the cylinder through the exhaust ports during the valve overlap period when the engine operates under high load operating conditions in which the mechanical supercharger also operates. Blowing out of the fuel mixture is caused by a supercharged pressure which becomes higher than an exhaust pressure.

Fuel adhering to the wall of the intake port is blown off in an intake stroke, together with the fuel mixture, and mixed in fuel injected by a fuel injector. This results in a slightly richer air fuel mixture than is ideal. Even in an engine having an exhaust system which has a catalytic converter including rhodium (CCRO), during purification of exhaust gases, there is a lack of oxygen in the exhaust system, resulting in an increase in emissions of hydrocarbons (HC) and carbon monoxide (CO) in the exhaust gases. Moreover, when the engine operates in a high speed, high load range, since there is an increase in the amount of fuel injected from the fuel injectors, there is a smaller amount of oxygen available in the catalytic converter rhodium than when the engine operates in a low speed, high load range. In order to avoid conditions in which engine knock tends to occur, a valve overlap time period may be designed to be relatively long in a high load region in which the mechanical supercharger is put into operation. Consequently, the engine may produce an increase in the amount of fuel blown out of the cylinder when a relatively high speed is reached, due to operation of the mechanical supercharger. This may result in an increased volume of fuel being discharged from the exhaust system, which increases the amounts of hydrocarbon (HC) and carbon monoxide (CO) in the emissions.

SUMMARY OF THE INVENTION

It is, therefore, a primary object of the present invention to provide an engine control system for controlling an internal combustion engine, equipped with a mechanical supercharger, which can suppress engine knock and avoid blowing out of fuel into an exhaust system.

It is another object of the present invention to provide an engine control system for controlling an internal combustion engine equipped with a mechanical supercharger which can decrease emissions of hydrocarbons and carbon monoxide in exhaust gas.

The above objects are achieved by providing a particular engine control system for an internal combustion engine equipped with a mechanical supercharger. The system includes a valve drive means for driving a first intake valve, a second intake valve, and exhaust valves provided for each cylinder so as to open and close a first intake port, a second intake port, provided separately from the first intake port, and exhaust ports, respectively, at a variable timing. The valve drive means is caused, by a control means, to retard opening and closing of the first intake port by the first intake valve with respect to opening and closing of the second intake port by the second intake valve, respectively, when the control means detects a specific range of engine operating conditions in which the mechanical supercharger is put into operation. A fuel injection means, such as a fuel injection valve, is disposed so as to inject fuel in the cylinder through the first intake port. The fuel injection means is activated to inject fuel during a valve overlap period between the first intake valve and the exhaust valve.

The engine control system further includes exhaust control means, such as a solenoid valve, which is controlled so as to introduce air into an exhaust system directly from an intake system upstream from an exhaust gas purification means, such as a catalytic converter including rhodium. Air is introduced into the exhaust system directly when a specific range of engine operating conditions is detected.

When the engine operates in a specific range of engine operating conditions in which the mechanical supercharger is operated, the valve overlap period between the first intake valve and the exhaust valve is extended. When the engine is subjected to a sustained high operational load under specified conditions, an air supplier is placed in an air supply mode.

With an exhaust gas purification system constructed as described above, when the engine is operating under a high load and specified engine conditions have been attained, the mechanical supercharger is engaged, and air flows in from the air supplier upstream from the exhaust purification catalyst in the exhaust pipe. Consequently, when the engine operates under specific high load conditions, both the intake and exhaust valves of each cylinder sustain an extended period of relative overlap in which they are each in an open condition. As a result, there is an increase in the amount of mixed air supplied to each cylinder which is pulled out of the exhaust pipe. However, by means of the air supplied, upstream from the exhaust gas purification catalyst in the exhaust pipe, from the air supplier, compensation is made for insufficient oxygen at the time of exhaust gas purification, and exhaust purification is efficiently accomplished by the catalyst. Consequently, the amount of HC and CO included within the exhaust gases being expelled through the exhaust pipe is controlled.

BRIEF DESCRIPTION OF THE DRAWINGS

The above and other objects and features of the present invention will be apparent to those skilled in the art from the following description of a preferred embodiment when considered in conjunction with the appended drawings, in which.

DETAILED DESCRIPTION OF THE PREFERRED EMBODIMENT

Figure 1:
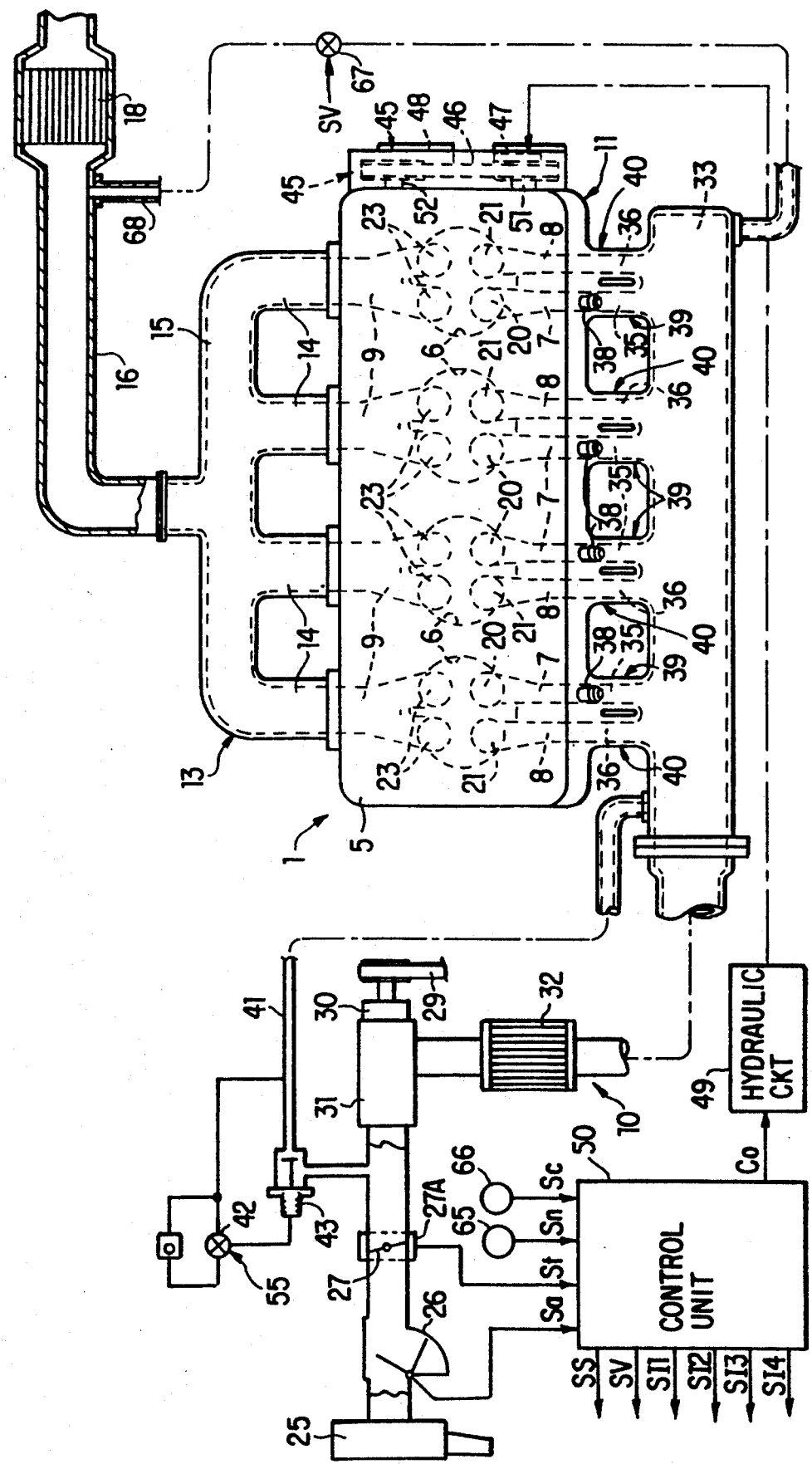
FIG. 1 is a schematic illustration showing an intake and exhaust control system for an internal combustion engine equipped with a mechanical supercharger in accordance with a preferred embodiment of the present invention.
Figure 2:
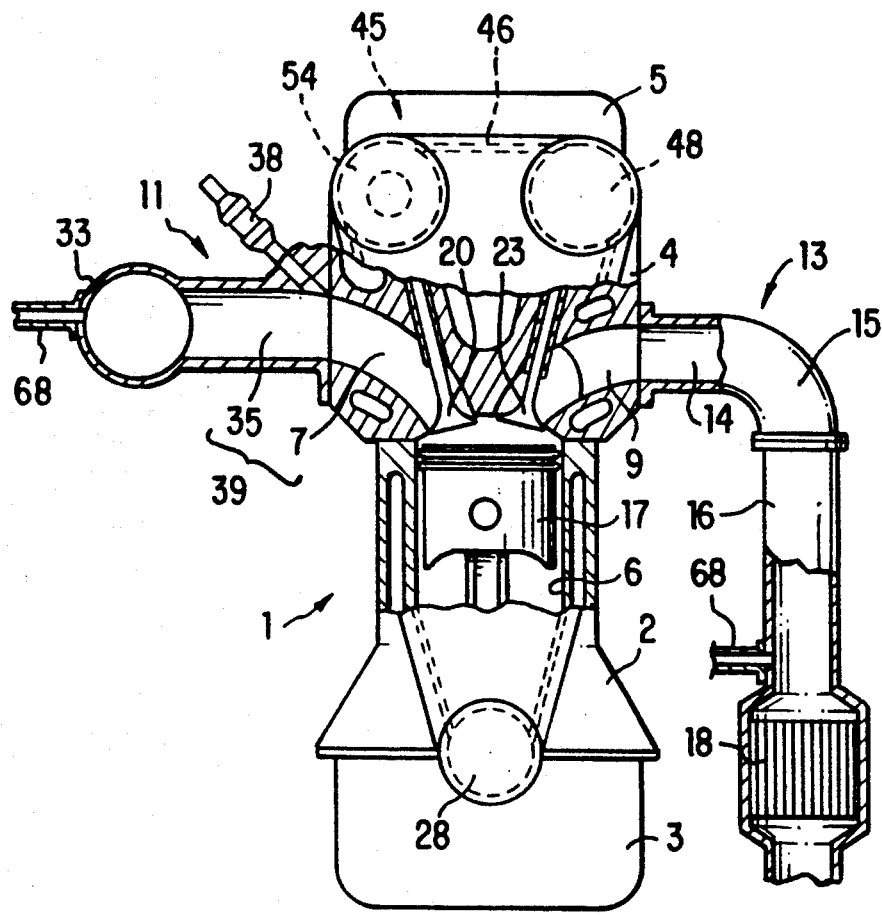
FIG. 2 is a cross-sectional view showing essential elements of the internal combustion engine shown in FIG. 1.
Figure 3:
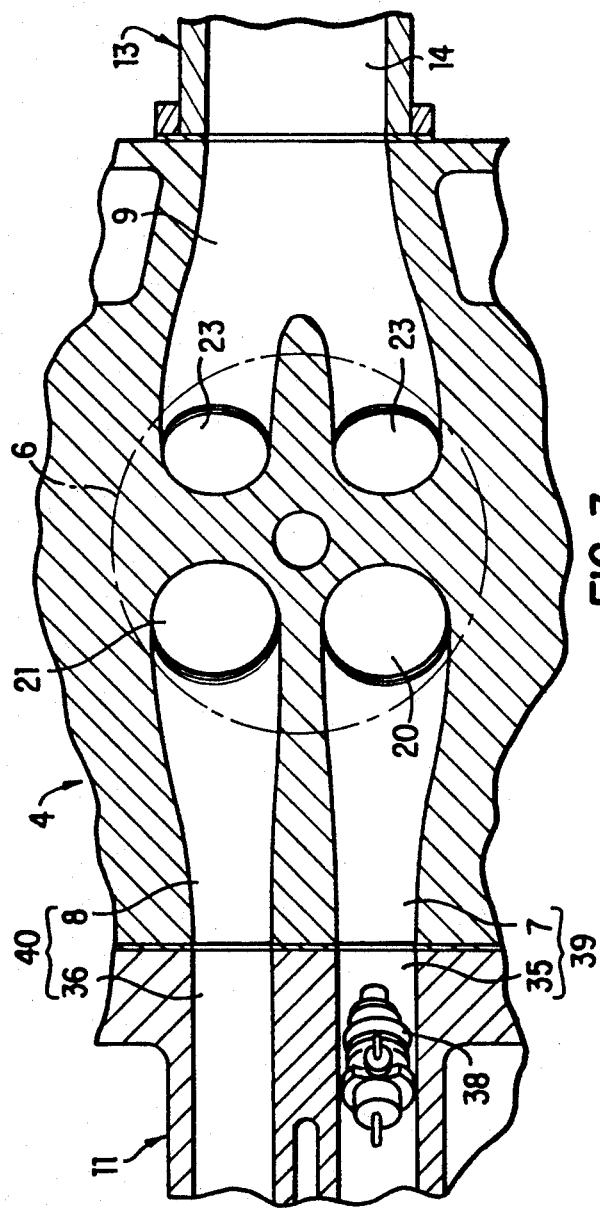
FIG. 3 is an enlarged view showing an intake mechanism of the internal combustion engine shown in FIG. 1.

Referring to the drawings and, in particular, to FIGS. 1 to 3, an in-series, four-cylinder internal combustion engine with a mechanical supercharger in accordance with a preferred embodiment of the present invention is shown. An engine body 1 includes a cylinder block 2, an oil pan 3 positioned below the cylinder block 2, a cylinder head 4 fitted to the top of the cylinder block 2, and a head cover 5 which covers the cylinder head 4. The engine 1 has four cylinders 6, formed in a straight line in the cylinder block 2, in which pistons 17 can slide. The cylinder head 4 is attached to a downstream end of an intake manifold 11 and an upstream end of an exhaust manifold 13.

Cylinder head 4 is formed with a pair of independent intake ports 7 and 8. The ports 7 and 8 open into each cylinder 6 at their downstream ends and are connected to first and second separate intake passages 35 and 36 formed by first and second separate intake pipes 39 and 40 of the intake manifold 11, respectively, at their upstream ends. The cylinder head 4 is also formed with a branched exhaust port 9 which opens into each cylinder 6 at its upstream end and is connected to a passage 14 of the exhaust manifold 13 at its downstream end. All of the separate intake pipes 39 and 40 are coupled to a surge tank 33 downstream from a common intake pipe 10.

A collector passage 15 in the exhaust manifold 13 is coupled to a common exhaust pipe 16. The common exhaust pipe 16 is provided with a catalytic converter 18, such as a catalytic converter having rhodium for exhaust purification. A fuel injector valve 38 is disposed in each first separate intake pipe 39 of the intake manifold 11. Each valve 38 is synchronized to inject fuel during an intake stroke of the corresponding cylinder 6. The common exhaust pipe 16 is communicated, at a portion upstream from the catalytic converter 18, with the surge tank 33 by an air supply pipe 68. The air supply pipe 68 is provided with a solenoid valve 67 so as to be opened and closed.

Cylinder head is provided with first and second intake valves 20 and 21 for each cylinder 6 which open and close the intake ports 7 and 8, respectively. Further, the cylinder head 4 is provided with a pair of exhaust valves 23 for each cylinder 6 which open and close the branched exhaust ports 9, respectively.

From its upstream end, the common intake pipe 10 is provided, in order, with an air cleaner 25, an air flow sensor 26, a throttle valve 27 having a throttle opening sensor 27A, a Rissholm type mechanical turbocharger 31, an inter-cooler 32, and a surge tank 33. Such elements are well known in the art and may be of any well known type. The mechanical supercharger 31 has a solenoid clutch 30, through which the mechanical supercharger 31 is operationally coupled to a crankshaft 28 of the engine 1 via a belt 29, so that the engine output transmitted from the crankshaft 28 is connected to or disconnected from the supercharger 28.

Figure 4:
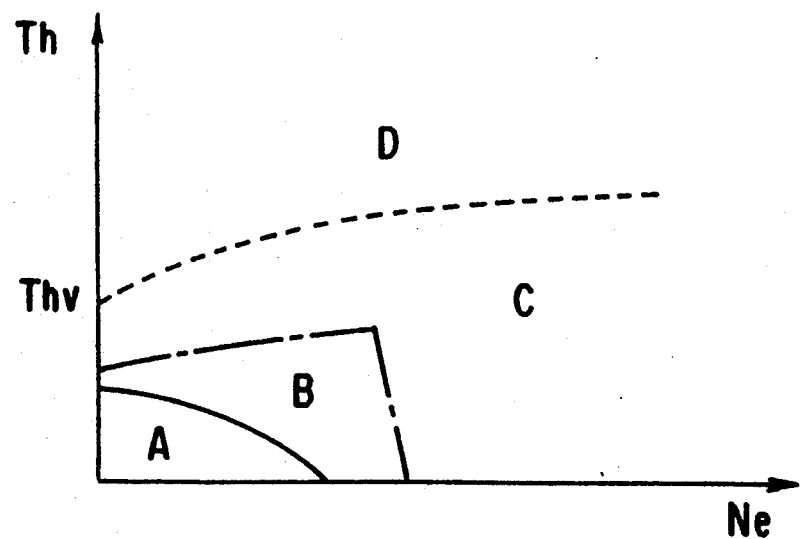
FIG. 4 is a diagram showing various engine operating ranges and characteristics.

FIG. 4 shows engine operating conditions in terms of engine speed Ne and throttle opening Th of the throttle valve 27, representing engine load. The solenoid clutch 30 operates to disconnect the engine output from the mechanical supercharger 31 when the engine 1 operates in a low speed, low load region A or in a relatively low speed, relatively low load region B. Further, the solenoid clutch 30 operates to connect the engine output to the mechanical supercharger 31 when the engine 1 operates in a relatively high speed, relatively high load region C and in a high speed, high load region D so as to cause the mechanical supercharger 31 to supercharge the engine 1.

Common intake pipe 10 is communicated by means of an intake bypass pipe 41 with the surge tank 33 at a point between the throttle valve 27 and the mechanical supercharger 31. The intake bypass pipe 41 is provided with a diaphragm type of bypass control valve 43 which is driven by a solenoid valve 42. Solenoid valve 42 responds to a control signal SS so as to allow the pressure of intake air developed in the surge tank 33 to be introduced into a pressure chamber of the bypass control valve 43 through the intake bypass pipe 41 when engine 1 operates in the operating range A or in the operating range B. On the other hand, when engine 1 operates in the operating range C or in the operating range D, the pressure of intake air in the surge tank 33 is not directed to the pressure chamber of the bypass control valve 43.

The operation of the solenoid valve 42 causes the bypass control valve 43 to open the intake bypass pipe 41 so as to allow intake air to flow directly into the surge tank 33 after passing through the throttle valve 27 but bypass the supercharger 31 and the inter cooler 32 when the engine 1 operates in the operating range or in the operating range B. In each of these ranges, the mechanical supercharger 31 does not operate. However, when the engine 1 operates in the range C or in the range D, the mechanical supercharger 31 is put into operation. The bypass control valve 43 controls the amount of intake air circulating into the intake bypass pipe 41 so that the pressure of intake air in the common intake pipe 10 downstream from the mechanical supercharger 31 is kept less than a specific pressure which has been predetermined to be sufficiently high, thereby supplying intake air passed through the throttle valve 27 to the mechanical supercharger 31 and developing a relatively high pressure in the surge tank 33. If the pressure of intake air in the common intake pipe 10 downstream from the mechanical supercharger 31 is raised beyond the specific high pressure, the solenoid valve 42 operates so as to cause the bypass control valve 43 to open the bypass pipe 41. This allows the pressure of intake air in the surge tank 33 to be led to the pressure chamber of the bypass control valve 43 through the intake bypass pipe 41. As a result, the pressure of intake air in the surge tank 33 is lowered, and the pressure of intake air in the common intake pipe 10 downstream from the mechanical supercharger 31 is regulated s that it is lower than the specific high pressure, thereby eliminating any development of intake air pressure in the common intake pipe 10 over the specific high pressure.

The solenoid valve 42 controls the operation of the bypass control valve 43 in the intake bypass pipe 41, as previously mentioned. A control signal SS is provided by a control unit 50 of the engine 1 to the solenoid valve 42. Various signals are supplied to the control unit 50. Such signals include an engine speed signal Sn provided from an engine speed sensor 65, a crank angle signal Sc provided from a crank angle sensor 66, an intake air flow rate signal Sa provided from the air flow sensor 26, and a throttle opening signal St provided from the throttle opening sensor 27. Such sensors are well known and may be of any well known type. The control unit 50, on the basis of these signals, provides a control signal SS and causes the solenoid valve 42 to force bypass control valve 43 to open the intake bypass pipe 41 when the engine operates in the range A or in the range B, thereby allowing the intake air pressure developed in the surge tank 33 to be led to the pressure chamber of the bypass control valve 43 through the intake bypass pipe 41.

Figure 5:
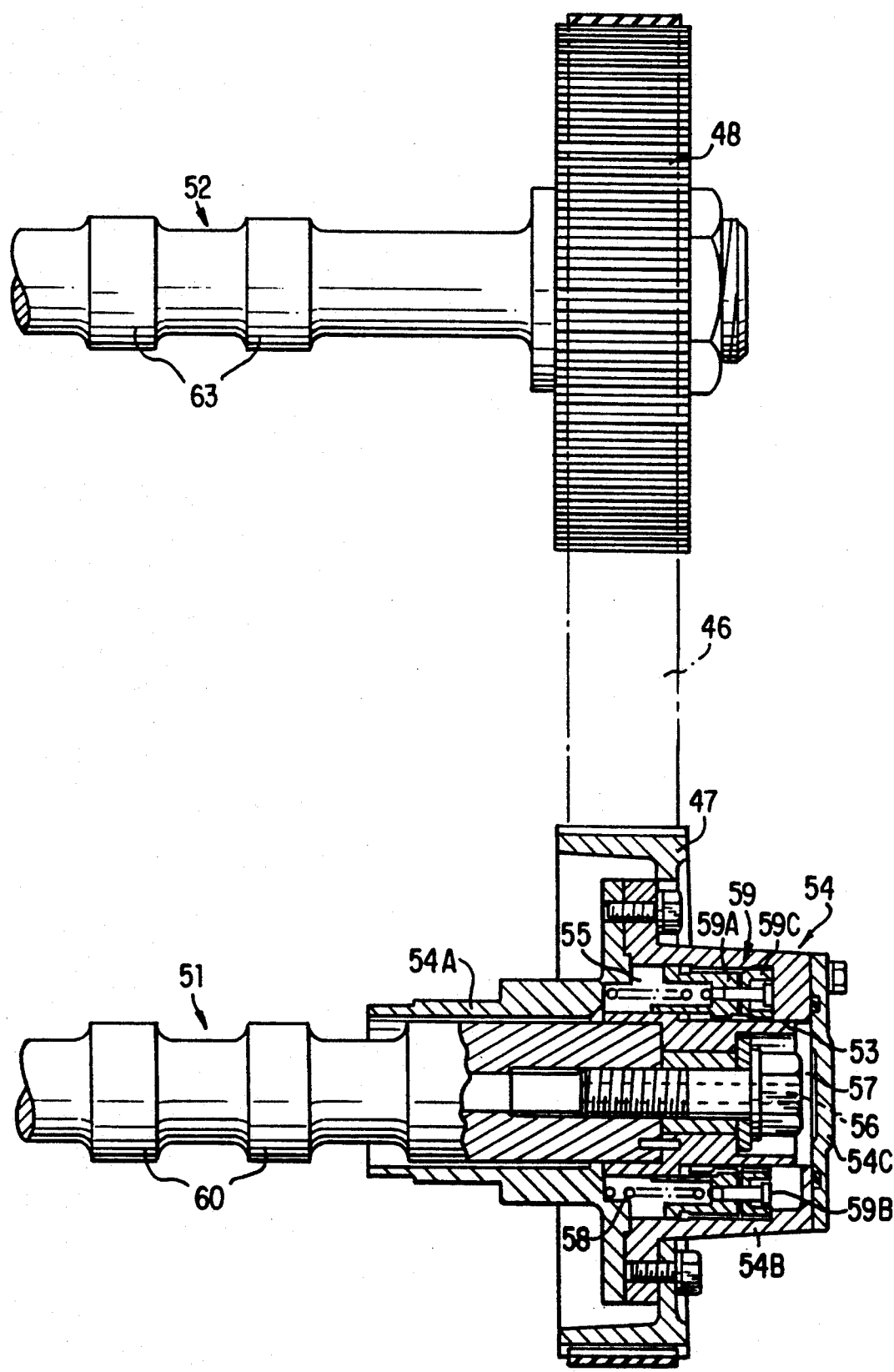
FIG. 5 is a plan view showing, partly in cross-section, a variable valve timing mechanism incorporated in the engine shown in FIG. 1.

Intake and exhaust valves 20, 21 and 23, which open and close the intake and exhaust ports 7, 8 and 9, respectively, of each of the cylinders 6, are driven by a valve drive mechanism (not specifically shown) and controlled, in operational timing, by means of a variable valve timing mechanism 45, shown in FIG. 5, incorporated in the cylinder head 4. The variable valve timing mechanism 45 is actuated by a hydraulic circuit 49 controlled by the control unit 50.

As is most clear from FIG. 5, the variable valve timing mechanism 45 includes a pair of gears 47 and 48 fastened to an intake camshaft 51 and an exhaust camshaft 52, respectively, one of which is operationally coupled to the crankshaft 28 so as to be connected to the engine output transmitted to the crankshaft 28 via a cog belt 46. The variable valve timing mechanism 45, which cooperates specifically with the intake camshaft 51, includes an annular spacer 53 bolted to an end portion of the intake cam shaft 51 and a cylindrical cover 54 covering the annular spacer. The cover 54 includes a first cylindrical cover component 54A, a second cylindrical cover component 54B and an end cover component 54C. The first cover component 54A is fitted onto an end portion of the intake cam shaft 51. The second cover component 54B is bolted to both the first cover component 54A and the gear 47 so as to form an annular space 55 around the spacer 53. The end cover component 54C covers end portion of the annular spacer 53 so as to form an axial gap 57 in communication with an oil passage 56 passing through the intake camshaft 51 and the spacer 53. Within the annular space 55 formed between the second cover component 54B and the annular spacer 53, an annular piston 59 and a return coil spring 58 for urging the annular piston 59 toward the end cover component 54C are disposed.

Annular piston 59 is composed of a first annular piston component 59A, positioned on a side of the first cover component 54A with respect to the spacer 53, and a second annular piston component 59C, positioned on aside of the end cover component 54C with respect to the spacer 53. The spacer 53 is secured to the first annular piston component 59A by means of several pins 59B. The annular piston is fitted to the internal wall of the second cover component 54B through a helical spline engagement and to the external wall of the spacer 53 through a helical spline engagement. The internal and external helical splines of the annular piston 59, in engagement with the second cover component 54B and the spacer 53, are opposite to each other in helical direction. The annular piston 59, thus structured, is positioned close to the end cover component 54C by the return coil spring 58 when no hydraulic pressure is supplied to the variable valve timing mechanism 45 from the hydraulic circuit 49. On the other hand, when hydraulic pressure is supplied to the variable valve timing mechanism 45, i.e., into the axial space 57 from the hydraulic circuit 49 through the oil passage 56, and acts on the second annular piston component 59C, the annular piston 59 is forced far away from the end cover component 54C against the force of the return coil spring 58.

Intake camshaft 51 is formed with a pair of first and second intake cam lobes 60 for each cylinder 6. The cam lobes 6 drive the first and second intake valves 20 and 21, respectively. Similarly, the exhaust camshaft 52 is formed with a pair of exhaust cam lobes 63, which drive respective exhaust valves 23. The first and second intake cam lobes 60 and 61 are designed so as to drive the first and second intake valves 20 and 21 to open and close the second intake port 8 in advance of or preceding opening and closing of the first intake port 7, which is connected to the first separate passage 35 with the fuel injection valve 38 therein. However, both exhaust cam lobes 63 are designed to drive the exhaust valves 23 so a to simultaneously open and close the exhaust ports 9.

Figure 6:
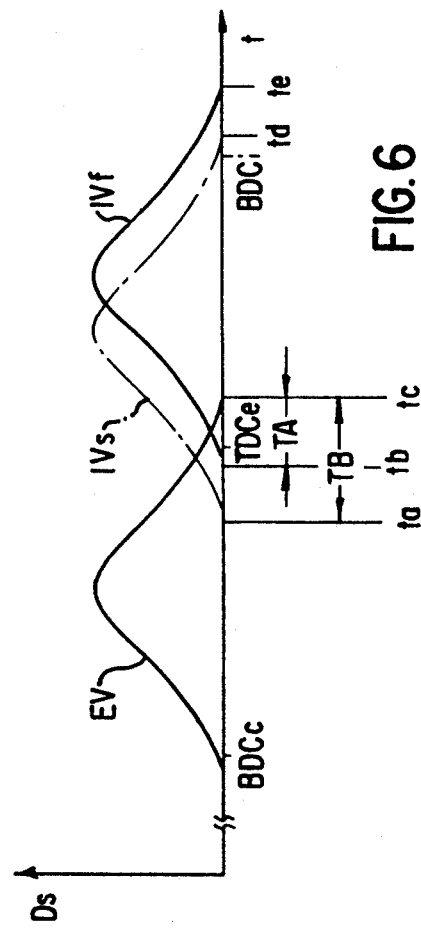
FIG. 6 is a diagram showing intake and exhaust valve opening characteristics.

Referring to FIG. 6, valve opening characteristic curves IVf, IVs and EV are shown, in terms of valve displacement Ds and time t, for the first intake valve 20, the second intake valve 21 and both the exhaust valves 23, respectively. As the intake camshaft 51 rotates, the second intake cam lobe 61 drives the second intake valve 21 so that the second intake valve 21 starts opening of the second intake port 8 at a time ta in advance of a top dead center position TDCe of the piston 17 in an exhaust stroke and ends the opening of the second intake port 8 at a time td after a bottom dead center position BDCi of the piston 17 in a following intake stroke, via a maximum opening. On the other hand, as shown by the valve opening characteristic curve EV, with the rotation of the exhaust camshaft 52, the exhaust cam lobes 63 simultaneously drive the exhaust valves 23 so that the exhaust valves 23 start opening the branched exhaust ports 9 in advance of the time the piston 17 reaches a bottom dead center position BDCc in an explosion or firing stroke. Opening of the exhaust ports 9 ends at a time tc after a top dead center position BDCe of the piston 17 in a following exhaust stroke, via a maximum opening. The valve overlap period TB between the second intake valve 20 and the exhaust valves 23 is established for a relatively short time period between the times ta and tc. However, as shown by the valve opening characteristic curve IVf, with rotation of the intake camshaft 51, the first intake cam lobe 60 drives the first intake valve 20 so that the first intake valve 20 starts opening of the first intake port 7 at a time tb in advance of the top dead center position TDCe of the piston 17 in the exhaust stroke but after the time ta and ends the opening of the first intake port 7 at a time te after the time td which is after the piston 17 reaches the bottom dead center position BDCi in the following intake stroke, via a maximum opening. In other words, the times tb and te at which the first intake valve 20 begins to open the first intake port 7 and finishes closing the first intake port 7, respectively, are retarded by a time equivalent to a phase difference in relative rotation between the intake cam lobes 60 and 61 with respect to the times ta and td, respectively, at which the second intake valve 21 begins to open the second intake port 8 and finishes closing the second intake port 8, respectively. Accordingly, the valve overlap period TA of the first intake valve 21 with the exhaust valves 23 is established at a time period between the times tb and to which is shorter than and within the valve overlap period TB of the second intake valve 20 with the exhaust valves 23 defined between the times ta and tc. The fuel injection valves 38 in the respective first separate intake passages 35 are controlled by means of injection pulses SI1, SI2, SI3 and SI4 from the control unit 50 to inject fuel within the valve overlap period TA, in which the first intake valve 20 and both the exhaust valves 23 are opened all together.

Control unit 50 provides a control signal Co on the basis of the signals Sn, Sc, Sa and St to the hydraulic circuit 49 so as to cause it to supply a hydraulic pressure to the variable valve timing mechanism 54. During the hydraulic pressure supply, the annular piston 59 is forced to displace against the force of the return coil spring 58, so as to advance the rotational phase of the intake camshaft 51 with respect to the exhaust camshaft 52. Consequently, both the valve overlap periods TA and TB are made longer. The control signal co is provided when the engine 1 operates in the A range and in the B range, in which the supercharger 31 operates and, accordingly, engine knocking occurs easily. However, when the engine 1 operates in the C range and in the D range, no control signal Co is provided. Further, the control unit 50 provides a control signal SV on the basis of the signals Sn, Sc, Sa and St to the solenoid valve 67 so as to open and close the air supply pipe 67.

Changing the valve overlap period TB between the second intake valve 21 and the exhaust valves 23 so that it is longer improves the scavenging of burned gases residing in the cylinders 6. Thus, there is an improvement in temperature control in the cylinders 6, which results in effective engine knock prevention. Because the valve overlap period TA of the first intake valve 20 with respect to the exhaust valves 23 is kept shorter than the valve overlap period TB of the second intake valve 20 with respect to the exhaust valves 23, and because shorter fuel injection is mad by the fuel injection valve 38 in the valve overlap period TA than in the valve overlap period TB, the introduction of fuel into the exhaust manifold 13 through the exhaust ports 9, which is caused by fuel blowing from the first intake port 7 to the exhaust port 23, is suppressed considerably. Furthermore, because the second intake valve 21 opens the second intake port 8 in advance of opening of the first intake port 7 by the second intake valve 20, fuel introduced into the cylinder 6 through the first intake port 7 is prevented from flowing back toward the second intake port 8.

It is to be understood that although valve overlap periods which are different in time length are established between the first intake valve 20 and the second intake valve 21 with respect to the exhaust valves 23, valve overlap periods of the same lengths may be provided between the first intake valve 20 and the second intake valve 21 with respect to the exhaust valves 23. Otherwise, the first intake valve 20 may have no valve overlap period with respect to the exhaust valves 23. In these cases, fuel injection is made while the first intake valve 20 is open.

Control unit 50 provides a control signal SV to the solenoid valve 67 only when the engine 1 operates in the range D so as to open the air supply pipe 68. However, when the engine 1 operates in the A, B or C range, the control units 50 never provide a control signal SV so as to keep the air supply pipe 68 closed. When the engine 1 operates in the D range, air is supplied into the common intake pipe 16 upstream of the catalytic converter 18 from the surge tank 33 through the air supply pipe 68. The air is then mixed with the exhaust gas discharged from the exhaust manifold 13 of the engine 1. The exhaust gas mixed with the air passes through the catalytic converter 18. There may be an increase in the amount of fuel mixture which is blown out into the common exhaust pipe 16 passing through the exhaust valves 23 at the beginning of an intake stroke when the valve overlap period is long. The fuel mixture, therefore, passes through the catalytic converter 18 along with the exhaust gases. However, any oxygen deficiency is overcome with the air supplied into the common exhaust pipe 16 upstream of the catalytic converter 18 from the surge tank 33 while the exhaust gases are being purified in the catalytic converter 18. As a result, emissions of hydrocarbons (HC) and carbon monoxide (CO) are well controlled.

Fuel injection valves 38, located in the vicinity of the separate intake pipes 39, are controlled by control signals SI1, SI2, SI3 and SI4 from control unit 50 to begin fuel injection at the beginning of the valve overlap period TA, during which the first intake valve 20 and the exhaust valves 23 simultaneously open. As a result, fuel is actually supplied into the cylinders 6 between a time immediately prior to termination of the valve overlap period and a time after termination of the valve overlap period. Accordingly, the amount of fuel being blown out from the intake valves 20 to the exhaust valves 23 is minimal.

Although, in the embodiment described above, no air is introduced into the common exhaust pipe 16 upstream of the catalytic converter 18 from the surge tank 33 through the air supply pipe 68 when the engine 1 operates in a range other than the high engine load region D, the air supply into the common exhaust pipe 16 from the surge tank 33 may also be interrupted or cut-off when it is detected that the fuel mixture supplied to the cylinders 6 is too lean as compared with an ideal air-fuel ratio. In order to detect the oxygen concentration in the exhaust gas, an oxygen sensor ($O_2$ sensor) is provided in the exhaust manifold 13 or in the common exhaust pipe 16. The output signal from the $O_2$ sensor is sent to control unit 50 to determine if the air fuel mixture being supplied to the cylinders 6 is too lean with respect to the ideal air-fuel ratio.

It is to be understood that although the present invention has been described with respect to a preferred embodiment thereof, various other embodiments and variants may occur to those skilled in the art. Any such other embodiments and variants which fall within the scope and spirit of the invention are intended to be covered by the following claims.

What is claimed is:

1. An engine control system for controlling an internal combustion engine equipped with a mechanical supercharger, said engine control system comprising:
    an engine including a plurality of cylinders, first intake ports, second intake ports, provided separately from said first intake ports, and exhaust ports for said cylinders;
    intake means for introducing air into said cylinders, said intake means including a first intake passage in communication with each of said first intake ports, a second intake passage, provided separately from said first intake passage, in communication with each of said second intake ports, and a common intake passage connected to each first intake passage and each second intake passage;
    fuel injection means disposed in each first intake passage for injecting fuel into each of said cylinders;
    a first intake valve for opening and closing each of said first intake ports;
    a second intake valve for opening and closing each of said second intake ports;
    an exhaust valve for opening and closing each of said exhaust ports;
    valve drive means for driving said first intake valve, said second intake valve and said exhaust valve so as to open and close said first intake ports, said second intake ports and said exhaust ports, respectively, at a variable timing; and
    control means for detecting engine operating conditions and causing said valve drive means to retard opening and closing of each first intake port by said first intake valve with respect to opening and closing of each second intake port by said second intake valve when a specific range of engine operating conditions is detected.

2. An engine control system as defined in claim 1, wherein said control means activates each of the fuel injection means to inject fuel during a valve overlap period between said first intake valve and said exhaust valve.

3. An engine control system as defined in claim 2, wherein said control means activates said supercharger when said specific range of engine operating conditions is detected.

4. An engine control system as defined in claim 2, wherein said valve drive means drives said first intake valve and said second intake valve so as to start opening of each second intake port in advance of each first intake port and to end closing of each second intake port in advance of each first intake port.

5. An engine control system as defined in claim 1, and further comprising exhaust means for discharging exhaust gases from said cylinders therethrough, said exhaust means including an exhaust passage for collecting said exhaust gases, exhaust gas purification means for purifying the exhaust gases disposed in said exhaust passage, and an air supply passage communicating said common intake passage with said exhaust passage upstream of said catalytic converter for supplying air into said exhaust passage from said common intake passage when said control means detects said specific range of engine operating conditions.

6. An engine control system as defined in claim 5, wherein said exhaust means further comprises a solenoid valve disposed in said air supply passage for opening and closing said air supply passage, said control means activating said solenoid valve to open said air supply passage when said specific range of engine operating conditions is detected.

7. An engine control system as defined in claim 5, wherein said exhaust gas purification means comprises a catalytic converter having rhodium.

* * * * *